US012654538B2

(12) United States Patent
Wallingford et al.

(10) Patent No.: US 12,654,538 B2
(45) Date of Patent: Jun. 16, 2026

(54) FRONT STEERABLE BEAM AXLE FITMENT AROUND AN ENGINE

(71) Applicant: Schaeffler Technologies AG & Co. KG, Herzogenaurach (DE)

(72) Inventors: Ronnie Wallingford, Copley, OH (US); Tyler Elfers, Medina, OH (US); Joshuah Fisher, Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 313 days.

(21) Appl. No.: 18/136,858

(22) Filed: Apr. 19, 2023

(65) Prior Publication Data

US 2024/0351423 A1     Oct. 24, 2024

(51) Int. Cl.

| | |
|---|---|
| *B60K 6/40* | (2007.10) |
| *B60K 6/365* | (2007.10) |
| *F16H 48/36* | (2012.01) |
| *F16H 48/42* | (2012.01) |
| *B60K 1/00* | (2006.01) |
| *B60K 6/445* | (2007.10) |
| *B60K 17/04* | (2006.01) |
| *B60K 17/16* | (2006.01) |
| *F16H 48/00* | (2012.01) |
| *F16H 57/02* | (2012.01) |

(52) U.S. Cl.
CPC ................. *B60K 6/40* (2013.01); *B60K 6/365* (2013.01); *F16H 48/36* (2013.01); *F16H 48/42* (2013.01); *B60K 2001/001* (2013.01); *B60K 6/445* (2013.01); *B60K 17/043* (2013.01); *B60K 17/165* (2013.01); *B60Y* 2400/804 (2013.01); *F16H 2048/04* (2013.01); *F16H 2057/0203* (2013.01)

(58) Field of Classification Search
CPC ............. F16H 37/0813; F16H 2048/04; F16H 2048/02; F16H 2048/36; F16H 2048/364; F16H 48/42; F16H 2057/02082; F16H 2057/02043; F16H 2057/02034; F16H 2057/0203; B60K 6/40; B60K 6/445; B60K 2001/001; B60K 6/36; B60K 17/043; B60K 14/165; B60Y 2400/804
USPC .............. 180/65.6; 475/5, 223, 225; 74/413, 74/421 R, 421 A
See application file for complete search history.

(56) References Cited

U.S. PATENT DOCUMENTS

| | | | | |
|---|---|---|---|---|
| 2,222,614 A | * | 11/1940 | Gronich | .................. B02C 18/38 241/82.5 |
| 9,625,021 B2 | * | 4/2017 | Knoblauch | ......... F16H 37/0833 |
| 2016/0153537 A1 | * | 6/2016 | Kubo | ...................... F16H 48/36 475/248 |
| 2019/0207469 A1 | * | 7/2019 | Kohigashi | ............. F16H 57/033 |
| 2020/0062114 A1 | * | 2/2020 | Holmes | ................... F16H 48/05 |
| 2023/0151875 A1 | * | 5/2023 | Swales | ..................... B60K 1/00 74/331 |
| 2023/0219409 A1 | * | 7/2023 | Okuda | ................. B60K 7/0007 180/65.6 |

* cited by examiner

*Primary Examiner* — Roger L Pang
(74) *Attorney, Agent, or Firm* — Davidson Kappel LLC

(57) ABSTRACT

An electric axle system includes a first shaft for connecting to an electric motor and being rotatable about a first axis; a second shaft for connecting to a gearbox, the second shaft being coaxial with the first shaft and being rotatable about the first axis; and a gearing drivingly connecting the first shaft to the second shaft and having an effective rotation axis vertically below the first axis.

19 Claims, 5 Drawing Sheets

FRONT STEERABLE BEAM AXLE FITMENT AROUND AN ENGINE

The present disclosure relates generally to motor vehicles with electric propulsion systems, and more specifically to electric axle systems for motor vehicles.

BACKGROUND

Electric axle systems are known.

SUMMARY

An electric axle system is provided including a first shaft for connecting to an electric motor and being rotatable about a first axis; a second shaft for connecting to a gearbox, the second shaft being coaxial with the first shaft and being rotatable about the first axis; and a gearing drivingly connecting the first shaft to the second shaft and having an effective rotation axis vertically below the first axis.

The gearing may sequentially include a first gear stage, a second gear stage and a third gear stage.

The gearing may include gears rotatable about the first axis, a second axis and a third axis, the third axis and the second axis being vertically below the first axis.

An input gear of the first gear stage and an output gear of the third gear stage may be rotatable about the first axis.

An output gear of the first gear stage and an input gear of the second gear stage may be rotatable about the second axis.

An output gear of the second gear stage and an input gear of the third gear stage may be rotatable about the third axis.

The second axis may be horizontally offset from the first axis in a first direction and the third axis may be horizontally offset from the first axis in a second direction opposite the first direction.

The first gear stage may include an input gear concentrically arranged on and non-rotatably connected to the first shaft.

The third gear stage may include an output gear concentrically arranged on and non-rotatably connected to the second shaft.

The first gear stage may have a first gear ratio, the second gear stage may have a second gear ratio and the third gear stage may have a third gear ratio, and the second gear ratio may be greater than the first gear ratio and the third gear ratio.

The first gear ratio may be greater than the third gear ratio.

The first axis, the second axis and the third axis may together form a triangle, and a geometric center of the triangle may define the effective rotation axis.

The third axis and the second axis may be approximately equidistant from the first axis.

The third axis and the second axis may be vertically and horizontally approximately equidistant from the first axis.

The gearing may include gears rotatable about the first axis, a second axis and a third axis. The third axis and the second axis maybe vertically below the first axis. The gears of the gearing may include an input gear, an output gear and intermediate gears in a torque path between the input gear and the output gear. Centers of the intermediate gears may be vertically below a center of the input gear and a center of the output gear.

The gearing may sequentially include a first gear stage, a second gear stage and a third gear stage. The first gear stage may include the input gear and a first intermediate gear of the intermediate gears, the second gear stage may include a second intermediate gear and a third intermediate gear of the intermediate gears, and the third gear stage may include a fourth intermediate gear of the intermediate gears and the output gear.

The input gear and the output gear may be rotatably arranged on the first axis, the first intermediate gear and the second intermediate gear may be rotatably arranged on the second axis, and the first intermediate gear and the second intermediate gear may be rotatably arranged on the second axis.

The input gear may directly engage with and drives the first intermediate gear.

The first intermediate gear and the second intermediate gear may be non-rotatably fixed together.

The second intermediate gear may directly engage with and drive the third intermediate gear.

The third intermediate gear and the fourth intermediate gear may be non-rotatably fixed together.

The fourth intermediate gear may directly engage with and drive the output gear.

The electric axle system may further include an electric motor for producing a first torque. The gearing may be configured for receiving the first torque from the electric motor and outputting a second torque greater than the first torque. The electric axle system may further include a gearbox receiving the second torque.

The gearbox may include a planetary gearing driven by the second shaft and a differential driven by the planetary gearing.

The electric axle system may further include a disconnect unit arranged between the gearbox and the gearing for disconnecting the gearbox from the second shaft.

A drive system for a motor vehicle is also provided including the electric axle system and an internal combustion engine including an engine block and an oil pan below the engine block. The effective rotation axis of the gearing may be vertically below a bottom of the oil pan.

The electric axle system may include an input gear, an output gear and intermediate gears in a torque path between the input gear and the output gear, and centers of the intermediate gears may be vertically below the bottom of the oil pan.

The intermediate gears may be entirely vertically below the bottom of the oil pan.

BRIEF DESCRIPTION OF THE DRAWINGS

The present disclosure is described below by reference to the following drawings, in which.

DETAILED DESCRIPTION

Figure 1:
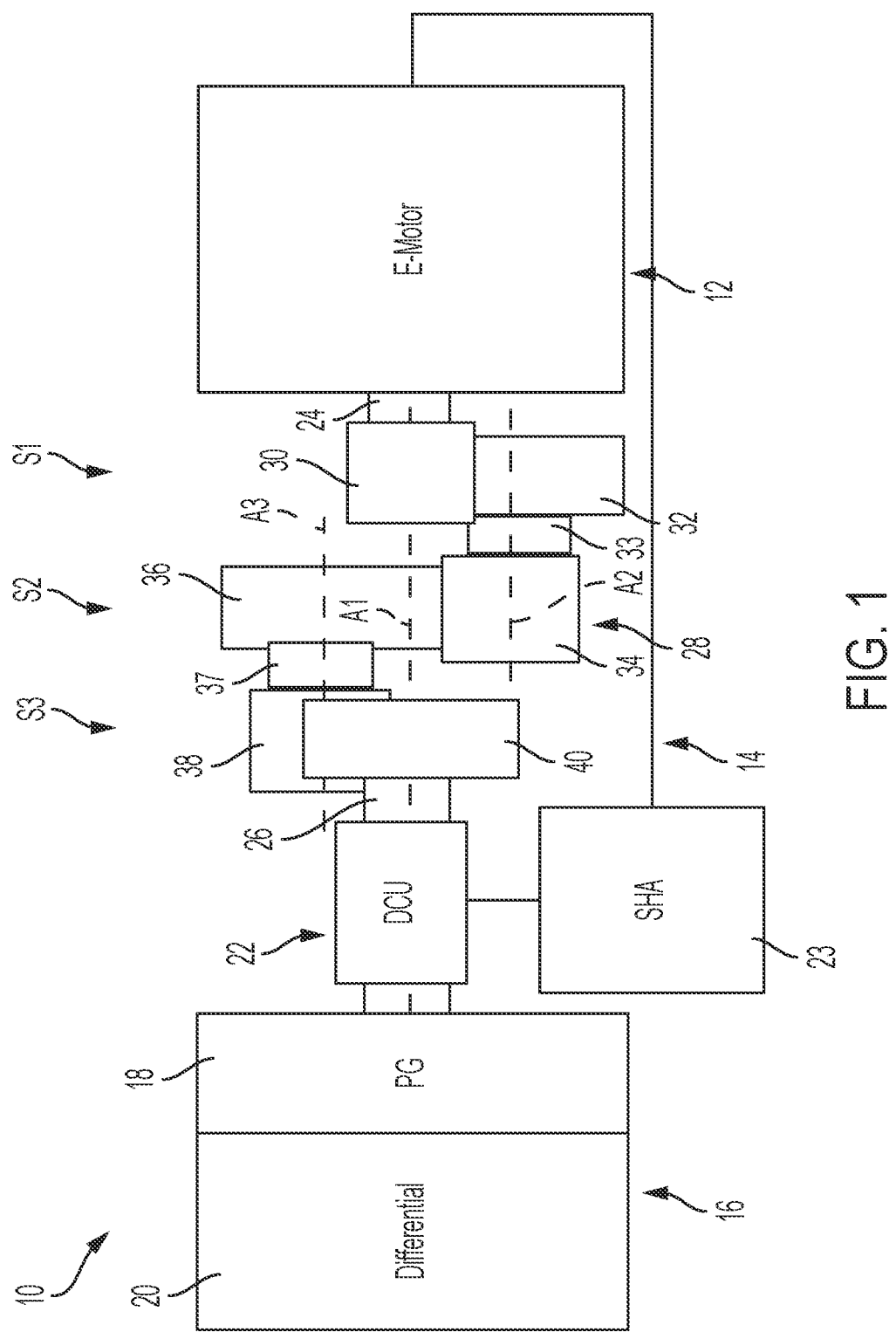
FIG. 1 shows downward facing schematic view of an electric axle system for a motor vehicle.

FIG. 1 shows downward facing schematic view of an electric axle system 10 for a motor vehicle including an electric motor 12 for producing a first torque, a gear system 14 for receiving the first torque from the electric motor and outputting a second torque and a gearbox 16 receiving the second torque for driving wheels of the motor vehicle. The gearbox 16 can include a planetary gearing 18 driven by gear system 14 and a differential 20 driven by the planetary gearing 18. Differential 20 in turn drives wheels of the motor vehicle.

Electric axle system 10 further includes a disconnect unit 22 arranged between the gearbox 16 and the gear system 14 for selectively disconnecting the gearbox 16 from and connecting the gearbox 16 to the gear system 14. A hydraulic actuator 23 can be provided for actuating disconnect unit 22.

As shown in FIG. 1, gear system 14 is advantageously radially compact and usable in a limited radial environment. The gear system 14 includes a first shaft 24 for connecting to electric motor 12 and being rotatable about a first axis A1 and a second shaft 26 for connecting to gearbox 16. The second shaft 26 is coaxial with the first shaft 24 and is also rotatable about the first axis A1. Gear system 14 includes gearing 28 drivingly connecting the first shaft 24 to the second shaft 26 to increase the torque at second shaft 26 in comparison with the torque at first shaft 24.

The gearing 28 includes gears 30 to 40 rotatable about three different axes A1, A2, A3. The gears 30 to 40 include an input gear 30, an output gear 40 and a plurality of intermediate gears 32 to 38 in a torque path between the input gear 30 and the output gear 40. More specifically, the gears 30 to 40 include an input gear 30 and an output gear 40 both rotatable about the first axis A1, a first intermediate gear 32 and a second intermediate gear 34 both rotatable about the second axis A2 and a third intermediate gear 36 and a fourth intermediate gear 38 both rotatable about the third axis A3. The second axis A2 and third axis A3 are vertically below the first axis A1. Centers C2 to C5 of the intermediate gears 32 to 38 are vertically below a center C1 of the input gear 30 and a center C6 (FIG. 3) of the output gear 40.

The input gear 30 is concentrically arranged on and non-rotatably connected to the first shaft 24. The output gear 40 is concentrically arranged on and non-rotatably connected to the second shaft 26.

The second axis A2 is horizontally offset from the first axis A1 in a first direction and the third axis A3 is horizontally offset from the first axis A1 in a second direction opposite the first direction.

The gearing 28 has an effective rotation axis AE vertically below the first axis A1. The effective rotation axis AE is defined as the geometric center of the axes A1 to A3 of gearing 28. For gearing 28, the first axis A1, the second axis A2 and the third axis A3 together form a triangle, and a geometric center of the triangle defining the effective rotation axis AE.

The third axis A3 and the second axis A2 are approximately (+/−10%) equidistant from the first axis A1. Advantageously, the third axis A3 and the second axis A2 are within +/−5% of being equidistant from the first axis A1, and can be equidistant from the first axis A1.

The third axis A3 and the second axis A2 are approximately (+/−10%) vertically equidistant from the first axis A1 and/or the third axis A3 and the second axis A2 are approximately (+/−10%) horizontally equidistant from the first axis A1. Advantageously, the third axis A3 and the second axis A2 are within +/−5% of being vertically and/or horizontally equidistant from the first axis A1, and can be horizontally and/or vertically equidistant from the first axis A1.

The gearing 28 sequentially includes a first gear stage S1, a second gear stage S2 and a third gear stage S3. The first gear stage S1 includes the input gear 30 and the first intermediate gear 32. The second gear stage S2 includes the second intermediate gear 34 and the third intermediate gear

36. The third gear stage S3 includes a fourth intermediate gear 38 and the output gear 40.

The first gear stage S1 has a first gear ratio, the second gear stage S2 has a second gear ratio and the third gear stage S3 has a third gear ratio. The second gear ratio is greater than the first gear ratio and the third gear ratio. The first gear ratio is greater than the third gear ratio.

The input gear 30 directly engages with and drives the first intermediate gear 32. For example, gears 30, 32 can each include teeth, with teeth of gear 30 intermeshing with teeth of gear 32.

The first intermediate gear 32 and the second intermediate gear 34 are non-rotatably fixed together. For example, gears 32, 34 can be non-rotatably fixed to a same intermediate shaft 33.

The second intermediate gear 34 directly engages with and drives the third intermediate gear 36. For example, gears 34, 36 can each include teeth, with teeth of gear 34 intermeshing with teeth of gear 36.

The third intermediate gear 36 and the fourth intermediate gear 36 are non-rotatably fixed together. For example, gears 36, 38 can be non-rotatably fixed to a same intermediate shaft 37.

The fourth intermediate gear 38 directly engages with and drives the output gear 40. For example, gears 38, 40 can each include teeth, with teeth of gear 38 intermeshing with teeth of gear 40.

In operation, torque enter gearing 28 by electric motor 12 driving first shaft 24, on which input gear 30 is non-rotatably mounted, causing input gear 30 to rotate about first axis A1. Input gear 30 then drives first intermediate gear 32 about second axis A2, causing second intermediate gear 34 to rotate about axis A2. Second intermediate gear 34 in turn drives third intermediate gear 36 about third axis A3, causing fourth intermediate gear 38 to rotate about third axis A3. Fourth intermediate gear 38 then drives output gear 40 about first axis A1, causing second shaft 26, on which output gear 40 is non-rotatably mounted, to rotate about axis A1.

Figure 2A:
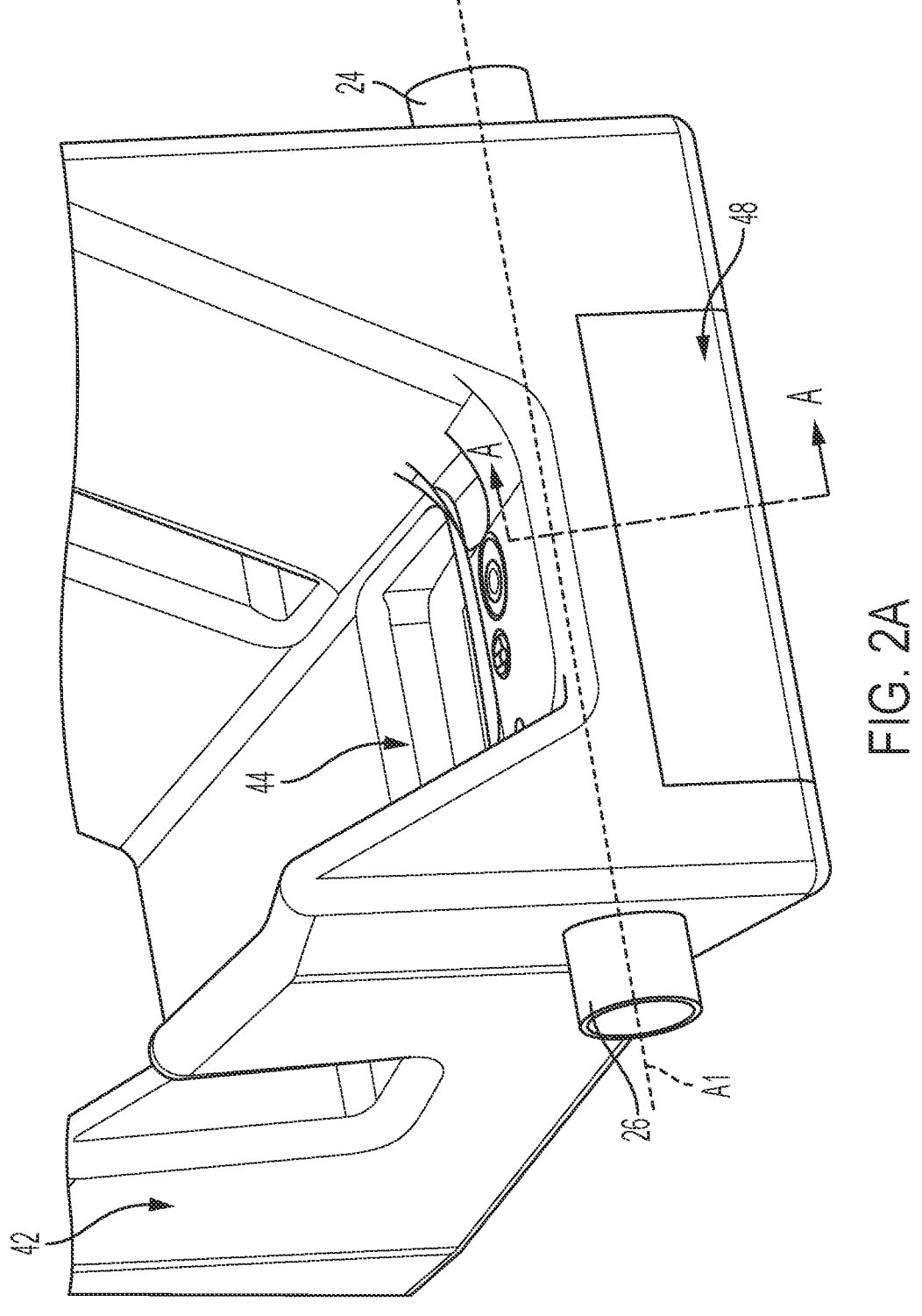
FIGS. 2a to 2d illustrate different views of gear system incorporated into a support structure defining an envelope for receiving an internal combustion engine.

FIGS. 2a to 2d illustrate different views of gear system 14 incorporated into a support structure 42 defining an envelope 44 (FIG. 2a) for receiving an internal combustion engine 46 (FIG. 2d) where a drive system of the motor vehicle includes both engine 46 and electric axle system 10. As shown in FIG. 2a, gearing 28 can be provided inside of a housing 48 within support structure 42, with shafts 24, 26 protruding from opposite sides of support structure 42.

Figures 2B, 2C:
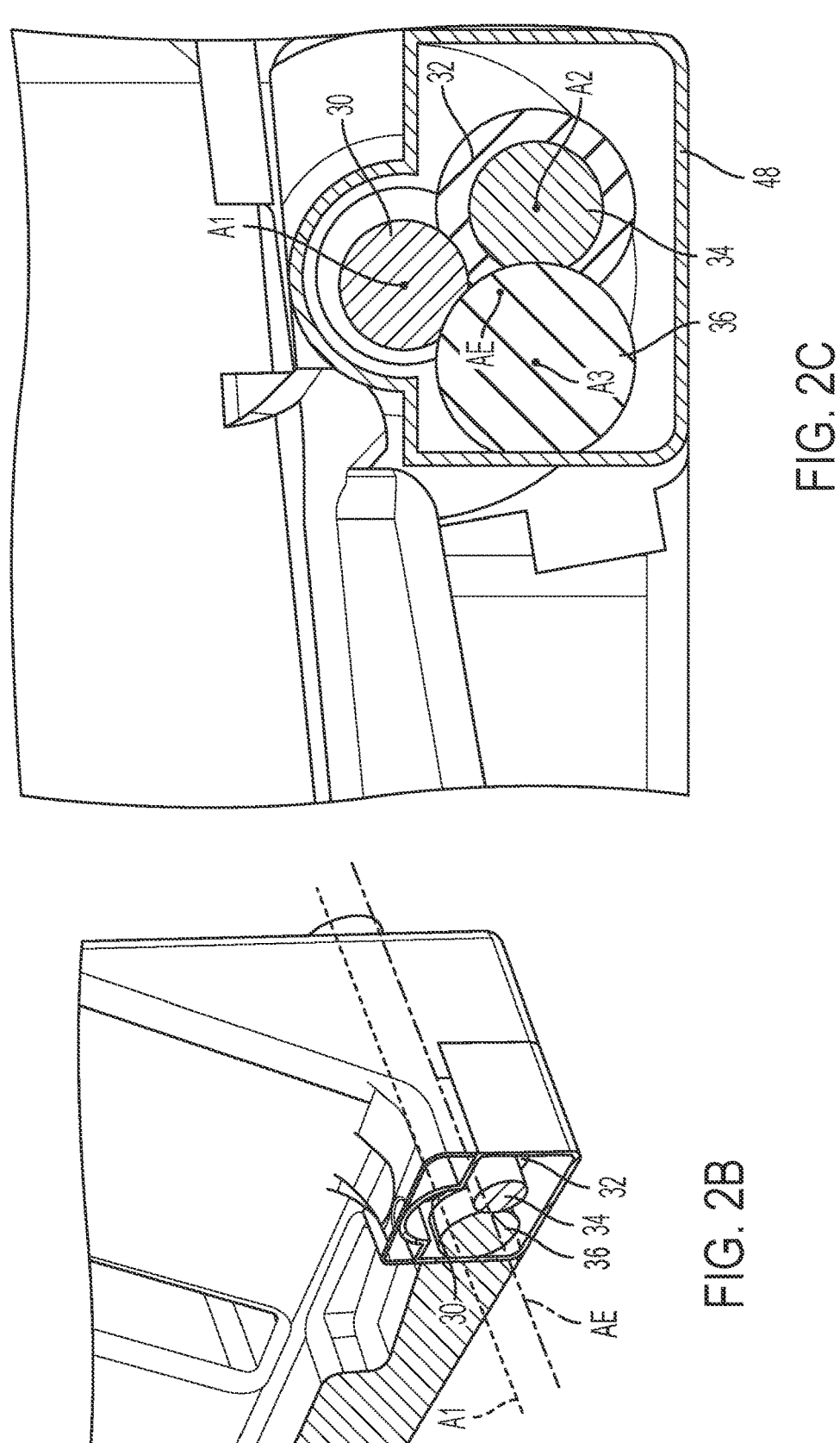

FIGS. 2b and 2c illustrate cross-sectional view taken along A-A in FIG. 2a. FIGS. 26, 2c shown gears 30 to 36 and illustrate the positioning of axes A1, A2, A3, along with effective rotation axis AE. As noted above, axes A1, A2, A3 form a triangle and effective rotation axis AE is shown schematically at the geometric center of axes A1, A2, A3.

Figure 2D:
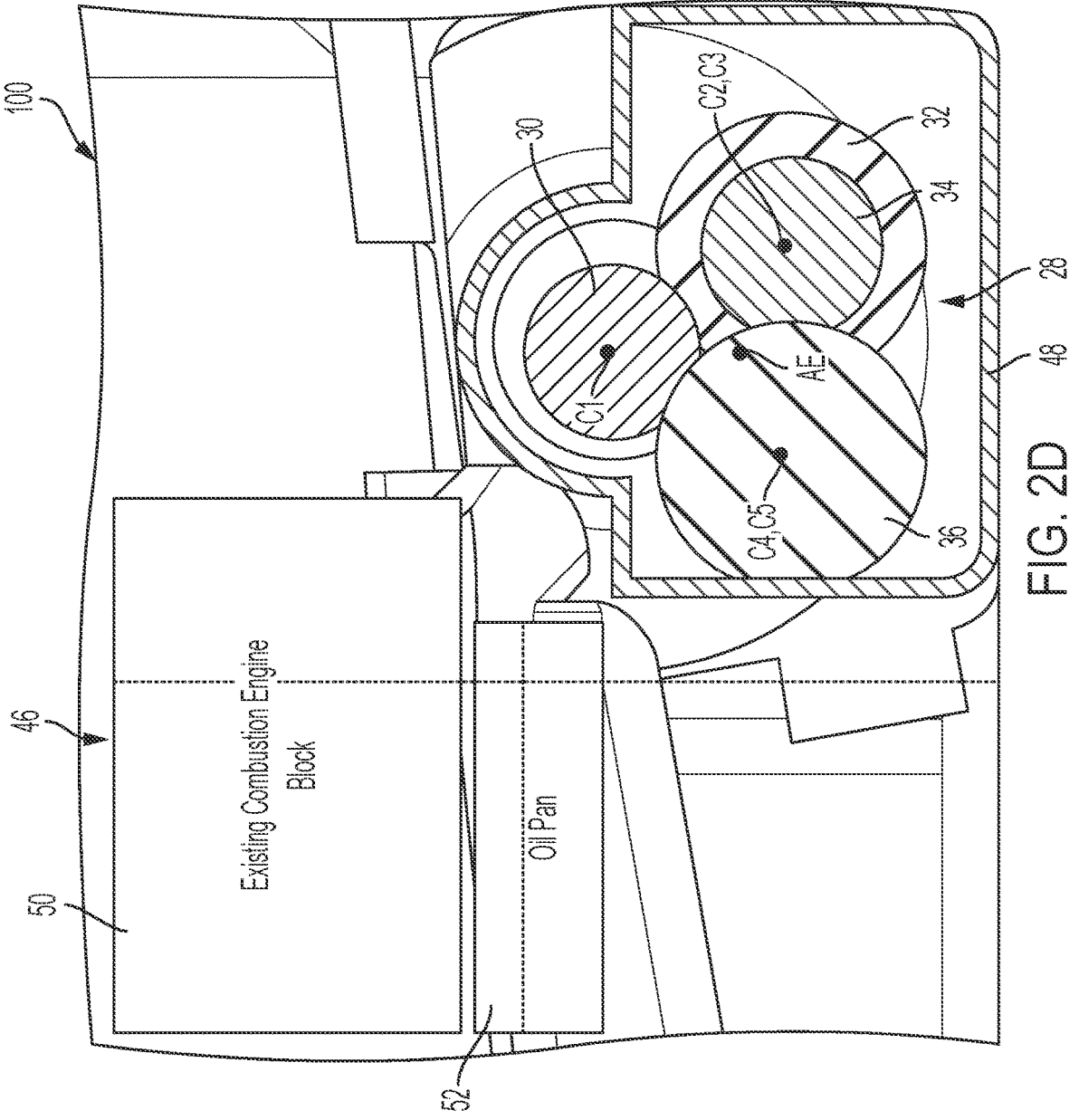

FIG. 2d illustrates combustion engine 46 arranged adjacent to gearing 28. Combustion engine 46 includes an engine block 50 and an oil pan 52 below the engine block 50. Engine 46 is snugly arranged with respect to gearing 28 such that engine block 50 overhangs housing 48 and intermediate gears 36, 38. The arrangement of intermediate gears 32 to 38 below input gear 30 and output gear 40 allows electric axle system 10 to be used with support structure 42 and engine 46.

Gearing 28 is installed adjacent to engine 46 with the effective rotation axis AE of the offset gear system 14 being vertically below a bottom of the oil pan. Centers C2 to C5 of the intermediate gears 32 to 38 are vertically below the bottom of the oil pan 52. Further, the intermediate gears 32 to 38 are entirely vertically below the bottom of the oil pan 52.

Figure 3:
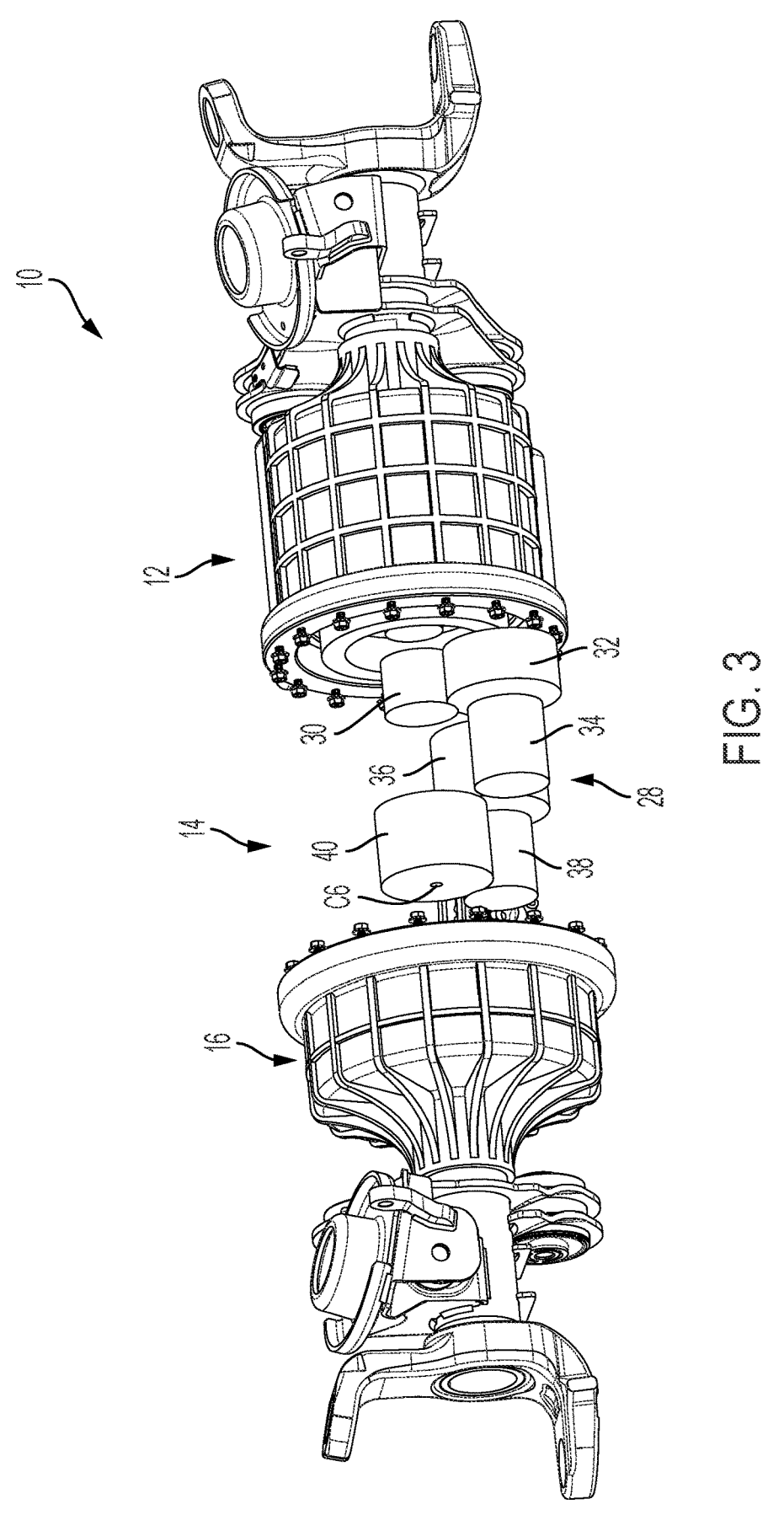
FIG. 3 shows an exploded perspective view of the electric axle system.

FIG. 3 shows an exploded perspective view of electric axle system 10 with housing 48 (FIGS. 2a to 2d) being omitted and gears 30 to 40 shown schematically. As shown in FIG. 3, electric axle system 10 is configured as a unitary axle arrangement, with all of the components of system 10 configured for being arranged in an axial path between the front wheels of the vehicle.

In the preceding specification, the present disclosure has been described with reference to specific exemplary embodiments and examples thereof. It will, however, be evident that various modifications and changes may be made thereto without departing from the broader spirit and scope of the present disclosure as set forth in the claims that follow. The specification and drawings are accordingly to be regarded in an illustrative manner rather than a restrictive sense.

REFERENCE NUMERALS 10 electric axle system
12 electric motor
14 gear system
16 gearbox
18 planetary gearing
20 differential
22 disconnect unit
23 hydraulic actuator
24 first shaft
26 second shaft
28 gearing
30 input gear
32 first intermediate gear
33 intermediate shaft
34 second intermediate gear
36 third intermediate gear
37 intermediate shaft
38 fourth intermediate gear
40 output gear
42 support structure
44 envelope
46 engine
48 housing
50 engine block
52 oil pan

What is claimed is:

1. An electric axle system comprising:
a first shaft for connecting to an electric motor and being rotatable about a first axis;
a second shaft for connecting to a gearbox, the second shaft being coaxial with the first shaft and being rotatable about the first axis; and
a gearing drivingly connecting the first shaft to the second shaft and having an effective rotation axis vertically below the first axis,
the gearing includes gears rotatable about axes consisting of the first axis, a second axis and a third axis, the third axis and the second axis being vertically below the first axis,
the first axis, the second axis and the third axis together form a triangle, a geometric center of the triangle defining the effective rotation axis.

2. The electric axle system as recited in claim 1 wherein the gearing sequentially includes a first gear stage, a second gear stage and a third gear stage.

3. The electric axle system as recited in claim 2 wherein the first gear stage includes an input gear concentrically arranged on and non-rotatably connected to the first shaft.

4. The electric axle system as recited in claim 2 wherein the third gear stage includes an output gear concentrically arranged on and non-rotatably connected to the second shaft.

5. The electric axle system as recited in claim 1 wherein the gears of the gearing include an input gear, an output gear and intermediate gears in a torque path between the input gear and the output gear, centers of the intermediate gears being vertically below a center of the input gear and a center of the output gear.

6. The electric axle system as recited in claim 5 wherein the gearing sequentially includes a first gear stage, a second gear stage and a third gear stage,
the first gear stage including the input gear and a first intermediate gear of the intermediate gears,
the second gear stage including a second intermediate gear and a third intermediate gear of the intermediate gears,
the third gear stage including a fourth intermediate gear of the intermediate gears and the output gear.

7. The electric axle system as recited in claim 6 wherein the input gear and the output gear are rotatably arranged on the first axis, the first intermediate gear and the second intermediate gear are rotatably arranged on the second axis, and the third intermediate gear and the fourth intermediate gear are rotatably arranged on the third axis.

8. The electric axle system as recited in claim 6 wherein the input gear directly engages with and drives the first intermediate gear.

9. The electric axle system as recited in claim 6 wherein the first intermediate gear and the second intermediate gear are non-rotatably fixed together.

10. A drive system for a motor vehicle comprising:
the electric axle system as recited in claim 1;
an internal combustion engine including an engine block and an oil pan below the engine block, the effective rotation axis of the gearing being vertically below a bottom of the oil pan.

11. The drive system as recited in claim 10 wherein the gearing includes an input gear, an output gear and intermediate gears in a torque path between the input gear and the output gear, centers of the intermediate gears being vertically below the bottom of the oil pan.

12. The drive system as recited in claim 11 wherein the intermediate gears are entirely vertically below the bottom of the oil pan.

13. An electric axle system comprising:
a first shaft for connecting to an electric motor and being rotatable about a first axis;
a second shaft for connecting to a gearbox, the second shaft being coaxial with the first shaft and being rotatable about the first axis; and
a gearing drivingly connecting the first shaft to the second shaft and having an effective rotation axis vertically below the first axis, the gearing including gears rotatable about the first axis, a second axis and a third axis, the third axis and the second axis being vertically below the first axis,
the gearing sequentially includes a first gear stage, a second gear stage and a third gear stage,
an input gear of the first gear stage and an output gear of the third gear stage being rotatable about the first axis,
the input gear of the first gear stage being non-rotatably connected to the first shaft, the output gear of the third gear stage being non-rotatably connected to the second shaft, the first shaft being separate from the second shaft, the first gear stage, the second gear stage and the third gear stage being between the first shaft and the second shaft.

14. The electric axle system as recited in claim 13 wherein an output gear of the first gear stage and an input gear of the second gear stage are rotatable about the second axis.

15. The electric axle system as recited in claim 13 wherein an output gear of the second gear stage and an input gear of the third gear stage are rotatable about the third axis.

16. The electric axle system as recited in claim 13 wherein the second axis is horizontally offset from the first axis in a first direction and the third axis is horizontally offset from the first axis in a second direction opposite the first direction.

17. The electric axle system as recited in claim 13 wherein the first axis, the second axis and the third axis together form a triangle, a geometric center of the triangle defining the effective rotation axis.

18. The electric axle system as recited in claim 13 wherein the third axis and the second axis are approximately equidistant from the first axis.

19. The electric axle system as recited in claim 18 wherein the third axis and the second axis are vertically and horizontally approximately equidistant from the first axis.

* * * * *